United States Patent
Cai et al.

(10) Patent No.: US 8,621,307 B2
(45) Date of Patent: Dec. 31, 2013

(54) SOFT DECISION THRESHOLD CONTROL IN A SIGNAL RECEIVER USING SOFT DECISION ERROR CORRECTION

(75) Inventors: Yi Cai, Eatontown, NJ (US); Jerzy R. Domagala, Red Bank, NJ (US); Alexei N. Pilipetskii, Colts Neck, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 1116 days.

(21) Appl. No.: 12/108,155

(22) Filed: Apr. 23, 2008

(65) Prior Publication Data
US 2009/0269081 A1   Oct. 29, 2009

(51) Int. Cl.
G06F 11/30   (2006.01)

(52) U.S. Cl.
USPC ........... 714/746; 714/752; 714/758; 714/776; 714/790; 370/335; 375/242

(58) Field of Classification Search
USPC .......... 714/752, 758, 790, 776, 746; 375/242; 370/335
See application file for complete search history.

(56) References Cited

U.S. PATENT DOCUMENTS

| | | | |
|---|---|---|---|
| 6,182,261 B1 * | 1/2001 | Haller et al. | 714/758 |
| 6,426,978 B1 | 7/2002 | Bottomley et al. | |
| 7,388,522 B2 * | 6/2008 | Strong et al. | 341/56 |
| 7,424,651 B2 | 9/2008 | Domagala | |
| 2003/0135811 A1 * | 7/2003 | Xu et al. | 714/790 |
| 2005/0154955 A1 | 7/2005 | Cai et al. | |
| 2005/0216819 A1 * | 9/2005 | Chugg et al. | 714/786 |
| 2006/0013168 A1 * | 1/2006 | Agrawal et al. | 370/335 |
| 2006/0093023 A1 * | 5/2006 | Brown et al. | 375/219 |
| 2006/0224934 A1 * | 10/2006 | Cameron et al. | 714/752 |
| 2007/0011573 A1 * | 1/2007 | Farjadrad et al. | 714/760 |
| 2009/0158130 A1 * | 6/2009 | Cheun et al. | 714/786 |

OTHER PUBLICATIONS

International Search Report and Written Opinion dated Jul. 31, 2009 issued in PCT/US09/41358.
Onohara, et al., "Automatic Tracking of 3-bit Soft Decision Thresholds in Block Turbo Code based Forward Error Correction," Information Technology R&D Centre, Mitsubishi Electric Corporation.

(Continued)

*Primary Examiner* — Joshua P Lottich
*Assistant Examiner* — Jeison C Arcos

(57) ABSTRACT

A soft decision threshold control system and method may be used with a forward error correction (FEC) scheme to adjust or tune one or more soft decision thresholds in response to one or more bit value averages for the threshold(s) and in response to a bit error rate (BER). The bit value average for a soft decision threshold generally refers to an average number of binary values (e.g., logic ones and/or zeros) occurring in a bit stream detected using the soft decision threshold. For different BER levels in a particular system, for example, one or more of the soft decision thresholds may have a predetermined bit value average, which has been determined to provide a certain level of performance (e.g., an optimum performance). Thus, one or more of the soft decision thresholds may be adjusted such that the bit value averages for the soft decision thresholds are adjusted as a function of the BER. The settings of the soft decision thresholds may also be adjusted in response to changes in a signal amplitude of the input signal being detected.

25 Claims, 5 Drawing Sheets

(56) References Cited

OTHER PUBLICATIONS

Mizuochi, et al., "Forward Error Correction Based on Block Turbo Code with 3-Bit Soft Decision for 10-Gb/s Optical Communication Systems," IEEE Journal of Selected Topics in Quantum Electronics, vol. 10, No. 2, Mar./Apr. 2004. pp. 376-386.

Mizuochi, "Recent Progress in Forward Error Correction and Its Interplay with Transmission Impairments," IEEE Journal of Selected Topics in Quantum Electronics, vol. 12, No. 4, Jul./Aug. 2006, pp. 544-554.

Cai, et al., "On Optimal Decision Thresholds for Soft-Decision Error Correction Decoding in Fiberoptic Communication Systems," Optical Fiber Communication Conference, 2004. OFC 2004 vol. 1, Issue, Feb. 23-27, 2004.

* cited by examiner

SOFT DECISION THRESHOLD CONTROL IN A SIGNAL RECEIVER USING SOFT DECISION ERROR CORRECTION

TECHNICAL FIELD

The present application relates to transmission of information and, more particularly, to soft decision threshold control in a signal receiver using soft decision error correction.

BACKGROUND

Reliable optical communication systems use mechanisms for minimizing the effects of signal degradation occurring between associated transmitters and receivers. Signal degradation occurs due to a variety of factors and is exacerbated by the long-haul transmission distances and high optical channel counts required in many applications. Due to signal degradation, some transmitted data may be incorrectly interpreted at a receiver. If data is misinterpreted at a rate above that which is acceptable, the efficacy and viability of the system may be lost.

A variety of techniques for minimizing the effects of signal degradation have been investigated. Forward Error Correction (FEC) is one technique used to help compensate for signal degradation and provide "margin improvements" to the system. Margin improvements generally allow an increase in amplifier spacing and/or increase in system capacity. In a Wavelength Division Multiplexing (WDM) system, for example, margin improvements obtained through FEC techniques allow an increase in the bit rate of each WDM channel and/or a decrease in the spacing between WDM channels.

FEC typically involves insertion of a suitable error correction code into a transmitted data stream to facilitate detection and correction of data errors about which there is no previously known information. Error correction codes are generated in a FEC encoder for the data stream and are sent to a receiver including a FEC decoder. The FEC decoder recovers the error correction codes and uses them to correct any errors in the received data stream.

Of course, the efficacy of FEC techniques is impacted by the ability of the optical signal receiver to correctly detect transmitted data and error correction codes. Improvements in receiver signal detection thus translate to improved performance of FEC codes in providing correction of bit errors. A known receiver configuration includes a decision circuit for converting the received data signal into a binary electrical signal, e.g. including logic ones and zeros representative of the transmitted data. The decision circuit may, for example, include a comparator for comparing the received data signal with a predetermined voltage level (the decision threshold). If the voltage level of the received data signal is above the decision threshold at a particular sample time, the comparator may output a logic one. If, however, the voltage level of the received data signal is below the decision threshold, the comparator may output a logic zero. The decision circuit thus makes an initial decision (i.e., a hard decision) as to the data bit values of the received data stream. The FEC decoder detects and corrects errors in the data stream established by the hard decision circuit. Therefore, the setting of the decision threshold in the decision circuit is important in achieving optimal system bit error rate (BER).

One way to enhance FEC decoding capabilities is the use of soft decision receivers or detectors in combination with soft decision FEC decoders. According to such soft decision schemes, the soft decision detector includes multiple decision circuits with different decision thresholds (e.g., different threshold voltage levels). The multiple decision circuits produce multiple bit "soft" information, as compared to the single bit (i.e., a one or a zero) that is provided for hard decision detection. An n-bit soft decision scheme uses $2^n-1$ decision thresholds. Three decision thresholds are used in a 2-bit soft decision scheme, for example, and seven decision thresholds are used in a 3-bit soft decision scheme. The multiple bit soft information represents a confidence level in the received data and provides the FEC decoder with additional information, for example, whether the bit was very likely one, likely one, likely zero, or most likely zero. The extra information allows the use of more efficient soft decision FEC decoders, which allow operation in more noisy or more distorted channel conditions.

Optimization of decision thresholds is desirable in error correction systems. In order to achieve maximum error correction capability of soft decision FEC decoders, for example, the position (i.e., voltage) of decision thresholds may be optimized depending on factors such as the signal to noise ratio, bit error rate (BER), signal distortion, and other factors. Moreover, performance of an optical communication system experiences variations over time including signal power fluctuations, signal-to-noise ratio fluctuations, fluctuations in signal distortions due to polarization effects, and other fluctuations. Thus, decision thresholds should be adjusted in real time responsive to time varying parameters of an optical data channel.

Some existing hard decision receivers may simply minimize the amount of received errors (e.g., minimize BER) by adjusting the position of the single hard decision threshold. Such BER information may be readily available from the FEC decoder, which decodes and counts received errors. In soft decision receivers, however, the BER information alone is insufficient to adjust or optimize the multiple soft decision thresholds.

BRIEF DESCRIPTION OF THE DRAWINGS

These and other features and advantages of the present invention will be better understood by reading the following detailed description, taken together with the drawings wherein.

DETAILED DESCRIPTION

A soft decision threshold control system and method, consistent with embodiments described herein, may be used with a forward error correction (FEC) scheme to adjust or tune one or more soft decision thresholds in response to one or more bit value averages for the threshold(s) and in response to a bit error rate (BER). The bit value average for a soft decision threshold generally refers to an average number of binary values (e.g., logic ones and/or zeros) occurring in a bit stream detected using the soft decision threshold. For different BER levels in a particular system, for example, one or more of the soft decision thresholds may have a predetermined bit value average, which has been determined to provide a certain level of performance (e.g., an optimum performance). Thus, the settings of one or more of the soft decision thresholds may be controlled such that the bit value averages for the soft decision thresholds are adjusted as a function of the BER. The settings of the soft decision thresholds may also be adjusted in response to changes in a signal amplitude of the input signal being detected.

Figure 1:
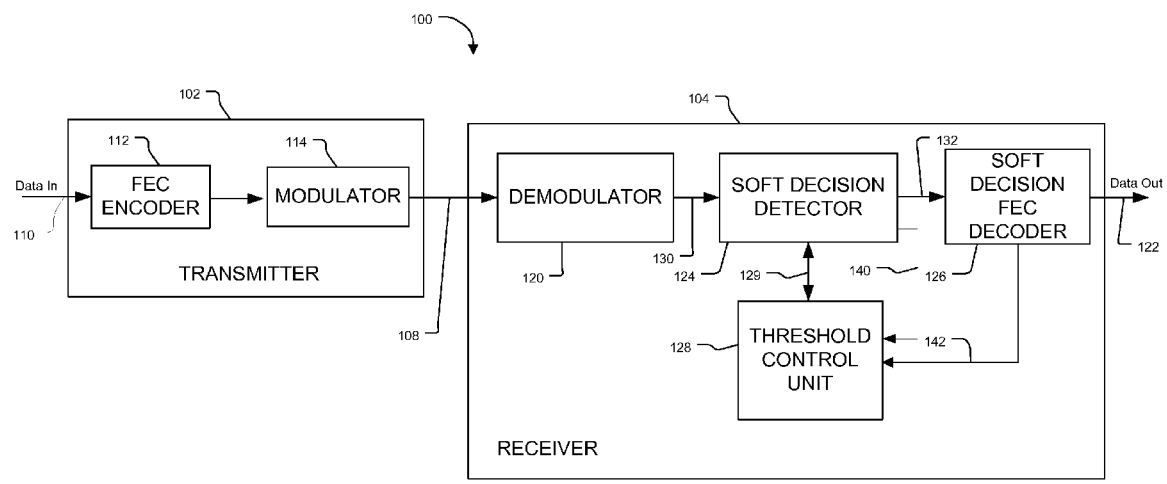
FIG. 1 is a schematic block diagram of an optical communication system including soft decision threshold control consistent with an embodiment.

Referring to FIG. 1, a soft decision threshold control system and method may be used in an optical communication system 100 that uses a FEC scheme. Although exemplary embodiments are described in the context of an optical system and are useful in connection with a long-haul WDM optical system, the broad concepts discussed herein may be implemented in other communication systems transmitting and receiving other types of signals. The optical communication system 100 may include a transmitter 102 for transmitting an encoded optical signal 108 and a receiver 104 for receiving the encoded optical signal 108. Those of ordinary skill in the art will recognize that the depicted system is highly-simplified for ease of explanation. For example, the transmitter 102 and the receiver 104 may be configured as one or more transceivers capable of performing both transmitting and receiving functions. The illustrated embodiments herein are provided only by way of explanation, not of limitation.

The transmitter 102 may include an FEC encoder 112 that encodes a data stream 110 with an error correction code and a modulator 114 that modulates an optical signal with the encoded data stream. The data stream 110 may be a binary data stream including a series of bits. Numerous FEC codes are known, each with different properties related to how the codes are generated and consequently how they perform. Examples of known error correcting codes include the linear and cyclic Hamming codes, the cyclic Bose-Chaudhuri-Hocquenghem (BCH) codes, the convolutional (Viterbi) codes, the cyclic Golay and Fire codes, and some newer codes such as the Turbo convolutional and product codes (TCC, TPC). Hardware and software configurations for implementing various error correcting codes in the encoder 112 and a corresponding decoder are known to those of ordinary skill in the art.

The modulator 114 may be implemented using optical modulation techniques and equipment known to those skilled in the art. The modulator 114 may modulate encoded data on an optical wavelength, e.g. from a continuous-wave laser source, using any modulation format known in the art, including, but not limited to, On-Off-Keying (OOK), Phase Shift Keying (PSK), and Differential Phase-Shift-Keying (DPSK) formats. These formats may be implemented in one or more known variations including, but not limited to, Return-to-Zero (RZ), Non-Return to Zero (NRZ) and Chirped-Return-to-Zero (CRZ) variations. For example, DPSK formats, such as RZ-DPSK, have proven advantageous in connection with long-haul optical communication systems.

The receiver 104 may include a demodulator 120, a soft decision detector 124, a soft decision FEC decoder 126, and a soft decision threshold control unit 128. The demodulator 120 demodulates the encoded optical signal 108 to provide a demodulated signal 130 and may be implemented using techniques and equipment known to those skilled in the art. The demodulated signal 130 may be degraded, for example, by amplified spontaneous emission (ASE) noise, distortions from an optical transmission line, and noise from photodetectors. The soft decision detector 124 detects the demodulated signal 130 and the soft decision FEC decoder 126 decodes the encoded data. The soft decision detector 124 and the soft decision FEC decoder 126 may operate from the same clock extracted from the signal 130.

The soft decision detector 124 receives the demodulated signal 130 as an input signal representing the encoded data stream. The soft decision detector 124 quantizes the signal 130 using a plurality of soft decision thresholds to produce one or more soft decision output signals 132 representing the encoded data using soft information. As used herein, "soft information" refers to additional information indicating a likelihood of the value of a bit. The soft decision detector 124 may detect the signal 130 using the soft decision thresholds to produce a plurality of soft decision detection signals corresponding to each of the detection thresholds. Each of these soft decision detection signals includes a bit stream of binary values (e.g., logic ones and zeros) obtained by comparing the input signal 130 to the respective soft decision detection thresholds. In an n-bit FEC scheme, for example, $2^n-1$ thresholds may be used to produce $2^n-1$ soft decision detection signals. The soft decision detector 124 may also encode the plurality of soft decision detection signals into multiple bit words representing the data from the demodulated signal 130. The soft decision output signal(s) 132 provided to the soft decision FEC decoder 126 may include the plurality of soft decision detection signals or the multiple bit words.

The soft decision FEC decoder 126 receives the soft decision output signal(s) 132 and decodes the encoded data represented by the output signal(s) 132 consistent with the implemented FEC scheme to produce a decoded data stream 122. The soft decision FEC decoder 126 may also determine the BER for the decoded data, which may change or vary during operation of the system. As used herein, "bit error rate" or "BER" may refer to any number or metric that represents or corresponds to a number of erroneous bits received relative to a total number of bits transmitted. In an exemplary embodiment, the BER determined by the soft decision FEC decoder 126 is the number of erroneous bits corrected by the soft decision FEC decoder 126 relative to (e.g., divided by) the total number of bits received by the soft decision FEC decoder 126. The BER may also be determined in other ways known to those skilled in the art.

The threshold control unit 128 controls the adjustment of the soft decision thresholds in the soft decision detector 124 (e.g., using threshold control signals 129) in response to bit value averages determined for one or more of the soft decision thresholds and in response to a BER determined for the decoded data. For different input BER levels, for example, there may be a predetermined bit value average (i.e., average number of detected zeros and/or ones) for at least some of the soft decision thresholds, which corresponds to a desired level of performance. The predetermined bit value averages may be, for example, optimum bit value averages that provide an optimal FEC decoding performance when using a particular soft decision FEC scheme and at a particular BER. The predetermined or optimum bit value averages may be determined by testing and/or calibrating the system and may be programmed into the threshold control unit 128. In an embodiment, the threshold control unit 128 may include a look up table, for example, that stores the mapping of predetermined bit value averages for the soft decision thresholds and associated with different BER levels. The soft decision detector 124 may be initially set with soft decision thresholds that are likely to provide the predetermined bit value averages for an anticipated BER. As the performance of the system changes over time, the threshold control unit 128 may adjust the soft decision thresholds in response to the changing BER and bit value averages and in response to changes in the signal amplitude of the input signal 130.

To determine the bit value averages and the BER, the threshold control unit 128 may receive one or more feedback signals 140, 142, which are representative of the bit value averages and the BER. In the exemplary embodiment, the soft decision detector 124 provides one or more bit value average feedback signals 140 representative of the bit value averages and the FEC decoder 126 provides one or more error feedback signals 142 representative of the BER determined by the FEC decoder 126. The threshold control unit 128 may determine the bit value averages from the bit value average feedback signal(s) and may obtain the BER from the error feedback signal(s). The threshold control unit 128 may then determine if those bit value averages determined from the bit value average feedback signals 140 are different from (i.e., higher or lower than) the respective predetermined bit value averages associated with a BER level corresponding to the BER obtained from the error feedback signal 142.

In other embodiments, the bit value average feedback signal and the error feedback signal may be generated and provided by other components. The bit value average feedback signal, for example, may be generated in the soft decision FEC decoder or in the threshold control unit. Although the soft decision detector and the FEC decoder are shown separately and may be implemented as discrete components, the soft decision detector and the FEC decoder may also be implemented as a single component. Also, one or more of the functions of the soft decision detector, as described herein, may be implemented in the soft decision FEC decoder, and vice versa.

Figure 2:
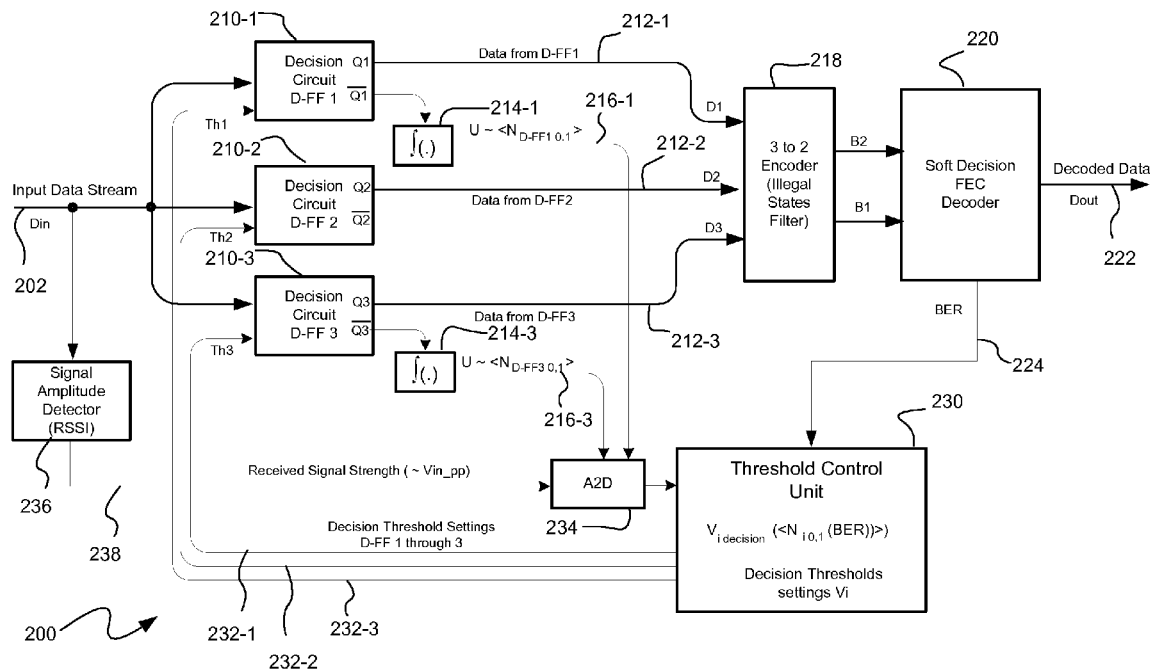
FIG. 2 is a schematic block diagram of an embodiment of a 2-bit soft decision detection system with soft decision threshold control.

FIG. 2 shows one embodiment of a soft decision threshold adjustment system 200 implemented using a 2-bit soft decision scheme. In the exemplary 2-bit soft decision scheme, three decision circuits 210-1 to 210-3 receive input signal 202 representative of the encoded data stream and produce respective soft decision detection signals 212-1 to 212-3. Each of the decision circuits 210-1 to 210-3 has a soft decision threshold setting and generates a binary decision (e.g., logic one or zero) for every bit received depending on the sample of the signal bit at the input and on the individual threshold setting. Each of the soft decision detection signals 212-1 to 212-3 thus includes a bit stream of binary values. The middle soft decision threshold of the middle decision circuit 210-2 may correspond to a hard decision threshold such that middle soft decision detection signal 212-2 provides a bit stream similar to that provided using hard decision detection.

The decision circuits 210-1 to 210-3 may be implemented using techniques and detection circuitry known to those skilled in the art. In one embodiment, the decision circuits 210-1 to 210-3 may include comparators for comparing the signal 202 with the respective decision thresholds and quantizing the signal 202 into the binary data stream and may include re-timing circuits for re-timing the quantized binary data stream. In another embodiment, the decision circuit may include a D-Flip Flop (D-FF) with an input allowing for decision threshold adjustment and a clock recovery circuit. In yet another embodiment, each of the decision circuits 210-1 to 210-3 may include a known Clock & Data Recovery circuit (CDR) with a decision threshold adjustment input.

In the exemplary embodiment, an encoder 218 encodes the soft decision detection signals 212-1 to 212-3 as 2-bit words, which are provided to a 2-bit soft decision FEC decoder 220 (also referred to as FEC decoder 220). In the 2-bit words, one of the bits is a hard decision bit and the other bit provides soft information. The soft decision FEC decoder 220 decodes the encoded data stream and generates decoded data 222 as an output. The soft decision FEC decoder 220 also calculates the BER based on the number of decoded errors in the data stream represented by the soft decision detection signal 212-2 from the middle decision circuit 210-2. The FEC decoder 220 may generate an error feedback signal 224 representing the determined BER.

A threshold control unit 230 may determine the adjustments to be made to the soft decision thresholds applied by the decision circuits 210-1 to 210-3. The decision threshold of the middle decision circuit 210-2 may be adjusted using known algorithms or techniques for hard decision threshold adjustment. For example, the decision threshold of the middle decision circuit 210-2 may be adjusted to minimize the determined BER and/or to maintain a balance of corrected ones and zeros in the FEC decoder 220, for example, as described in U.S. Patent Application Publication No. 2006/0136798, which is commonly owned and incorporated herein by reference. The outer decision thresholds of the outer decision circuits 210-1, 210-3 may be adjusted to achieve predetermined bit value averages for the soft decision detection signals 212-1, 212-3 as a function of the BER.

In an exemplary embodiment, the soft decision threshold adjustment system 200 includes integrating circuits 214-1, 214-3 that receive soft decision detection signals from the outer decision circuits 210-1, 210-3 and produce bit value average feedback signals 216-1, 216-3 representing the respective bit value averages. The decision circuits 210-1 to 210-3 may be D-FFs that provide differential outputs, for example, with one of the complimentary outputs being received by the integrating circuits 214-1, 214-3. The integrating circuits 212-1, 214-3 may include low pass filters (e.g., RC networks) that integrate the decision detection signals to produce the bit value average feedback signals 216-1, 216-3. An analog-to-digital converter 234 may convert these bit value average feedback signals 216-1, 216-3 into the digital domain for processing by the threshold control unit 230.

In an embodiment, the voltage output U of each of the integrating circuits 214-1, 214-3 is proportional to the average number of ones and/or the average number of zeros in the bit stream received by the respective integrating circuit as follows:

$$U \sim <N_1>*V_1+<N_0>*V_0 \quad (1)$$

where $<N_1>$ is the average number of ones, $<N_0>$ is the average number of zeros, $V_1$ is the voltage level of a binary value of one in the bit stream, and $V_0$ is the voltage level of a binary value of zero in the bit stream.

Recognizing that $\Delta V=V_1-V_0$ and $<N_1>+<N_0>=1$, the voltage output U may also be represented as follows:

$$U \sim <N_1>*\Delta V+V_0 \quad (2)$$

$$U \sim -<N_0>*\Delta V+V_1 \quad (3)$$

The threshold control unit 230 may thus compute the average number of ones (e.g., $<N_1>$) and/or the average number of zeros (e.g., $<N_0>$) from the voltage level of the bit value average feedback signals 216-1, 216-3.

In the exemplary embodiment, the bit value averages represented by $<N_1>$ and $<N_0>$ correspond to percentages of a total number of bits received by the respective integrating circuit. If $<N_1>=0.6$ and $<N_2>=0.4$, for example, then 60% of the received bits are ones and 40% of the received bits are zeros. The bit value averages may also be represented as an average number of ones and/or zeros per a sample of bits received, for example, an average of 60 bits per 100 received bits are ones and an average of 40 bits per 100 received bits are zeros. Those skilled in the art may recognize other ways of representing the bit value averages.

The threshold control unit 230 may compare the determined bit value average(s) (e.g., either the average number of ones, the average number of zeros, or both) to the predetermined bit value averages stored in the threshold control unit 230 for a BER level that corresponds to the determined BER (e.g., from error feedback signal 224). If the computed bit value average(s) is different than the predetermined bit value average(s) for the corresponding BER level, the threshold control unit 230 generates threshold control signals 232-1, 232-3 that cause the soft decision thresholds in the appropriate decision circuits 210-1, 210-3 to be adjusted in a manner that will cause the bit value average to at least approach the predetermined bit value average associated with the determined BER. The threshold control signals 232-1 to 232-3 may be threshold voltage settings that are incrementally changed to achieve the predetermined bit value averages associated with the determined BER.

The threshold control unit 230 may also control the thresholds in response to changes in signal amplitude of the input signal 202. Over time, the signal amplitude may change or drift, for example, as a result of noise, distortion or other effects. In the exemplary embodiment, a signal amplitude detector 236 may be used to monitor the amplitude of the input signal 202 and provide an input amplitude signal 238 representative of the received signal strength or peak-to-peak voltage ($V_{in\_pp}$) of the input signal 202. The signal amplitude detector 236 may be a received signal strength indicator (RSSI) such as the type used for demodulation of dither (pilot) tones in differential phase-shift keying (DPSK) systems. The input amplitude signal 238 may also be converted to digital by the analog-to-digital converter 234 for processing by the threshold control unit 230.

The threshold control unit 230 may store one or more calibration values upon power up of the system, which are representative of an initial signal amplitude relative to the outer threshold settings. According to an embodiment, for example, the outer most decision circuits (e.g., 210-1, 210-3 in FIGS. 2 and 310-1, 310-7 in FIG. 3) may be used to scan the input signal profile after initial power up. In particular, the decision threshold of the first decision circuit (e.g., 210-1 or 310-1) may be moved up until the output shows a predetermined mark to space or one to zero ratio (e.g., 1:3) and correspondingly the decision threshold of the last decision circuit (e.g., 210-7 or 310-7) may be moved down until the output shows a predetermined one to zero ratio (e.g., 3:1). The corresponding decision threshold levels representing the positive and negative peak of the input signal are stored (e.g., in RAM in the threshold control unit 230, 330) as an estimated peak-to-peak voltage level. The initial received signal strength (RSS) level, which is representative of the input signal amplitude, may also be measured (e.g., using the signal amplitude detector 236, 336) and stored in memory. The ratio of this calibration value of the initial RSS level and the estimated peak-to-peak voltage level may then be stored and used to make adjustments in response to the changes in input signal amplitude.

During operation, the threshold control unit 230 monitors the input amplitude (e.g., represented by the input amplitude signal 238) and determines if the input amplitude changes over time. In response to a change in the input amplitude, the threshold control unit 230 may adjust one or more decision thresholds proportional to the change in amplitude of the input signal. If a change in input signal amplitude is detected, for example, the threshold control unit 230 may make an additional adjustment to the threshold(s) using the measured change in input signal amplitude and the stored calibration ratio of the initial RSS level to the estimated peak-to-peak voltage level.

The threshold control unit 230 may include circuits configured with components known to those skilled in the art to perform the functions described above, for example, determining bit value averages, obtaining the BER, storing predetermined bit value averages, comparing bit value averages and generating threshold adjustment control signals. The integrating circuits may also be implemented with circuit components known to those skilled in the art to provide the output described above. The integrating circuits may be implemented separately as shown or in any of the decision circuits, the soft decision FEC decoder, or the threshold control unit.

Figure 3:
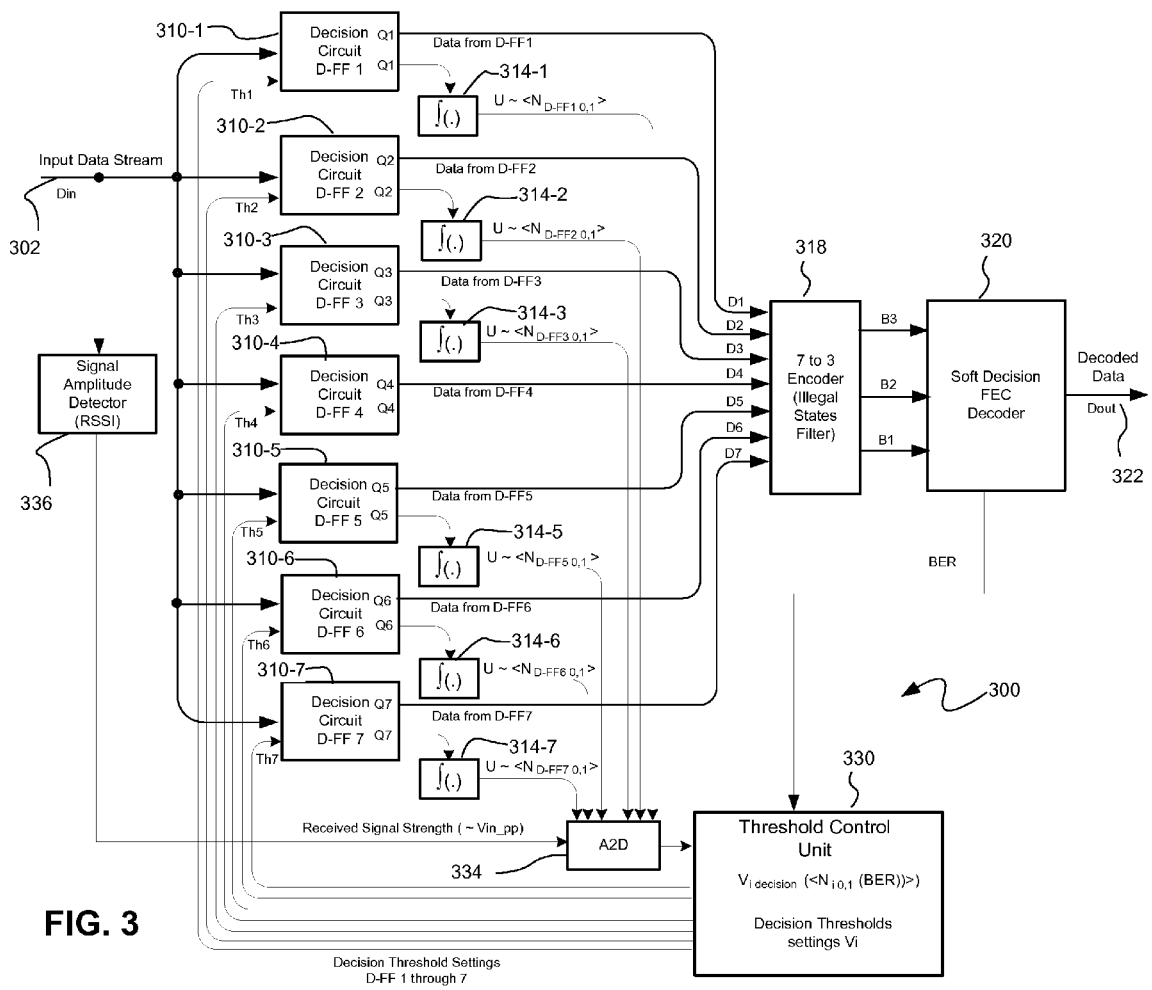
FIG. 3 is a schematic block diagram of an embodiment of a 3-bit soft decision detection system with soft decision threshold control.

FIG. 3 shows one embodiment of a soft decision threshold adjustment system 300 using a 3-bit soft decision scheme. In the exemplary 3-bit soft decision scheme, seven decision circuits 310-1 to 310-7 apply seven soft decision thresholds to the input signal 302 to produce seven soft decision detection signals. The middle decision circuit 310-4 uses a soft decision threshold that is adjusted similar to a hard decision threshold (e.g., to minimize BER). The outer decision circuits 310-1, 310-2, 310-3, 310-5, 310-6, 310-7 use soft decision thresholds that are adjusted in response to bit value averages as a function of BER, as discussed above. An encoder 318 receives the seven soft decision detection signals and generates 3-bit words encoded from the seven soft decision detection signals. A 3-bit soft decision FEC decoder 320 (also referred to as FEC decoder 320) receives the 3-bit words and decodes the encoded data to produce a decoded data stream 322. In this embodiment, integrating circuits 314-1, 314-2, 314-3, 314-5, 314-6, 314-7 may follow the outer decision circuits 310-1, 310-2, 310-3, 310-5, 310-6, 310-7 to generate bit value average feedback signals and a signal amplitude detector 336 may generate an input amplitude signal as discussed above. A threshold control unit 330 controls the setting of the thresholds in response to the digitized bit value average feedback signals and amplitude signal received from analog-to-digital converter 334 and the BER feedback signal from the FEC decoder 320.

The soft decision thresholds are adjusted in the 3-bit soft decision threshold adjustment system 300 in the same way as in the 2-bit system described above, except there are more thresholds that are adjusted. Although 2-bit and 3-bit soft decision schemes are illustrated, the soft decision threshold adjustment system and method described herein may be applied to other n-bit soft decision schemes having different numbers of soft decision thresholds.

Figure 4:
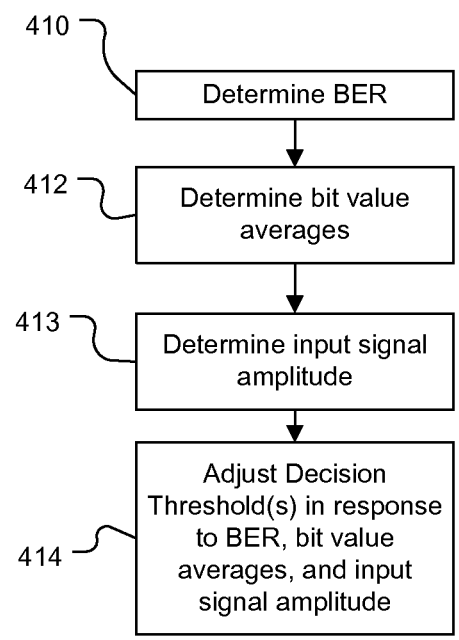
FIGS. 4 and 5 are block flow diagrams illustrating exemplary soft decision threshold control methods.
Figure 5:
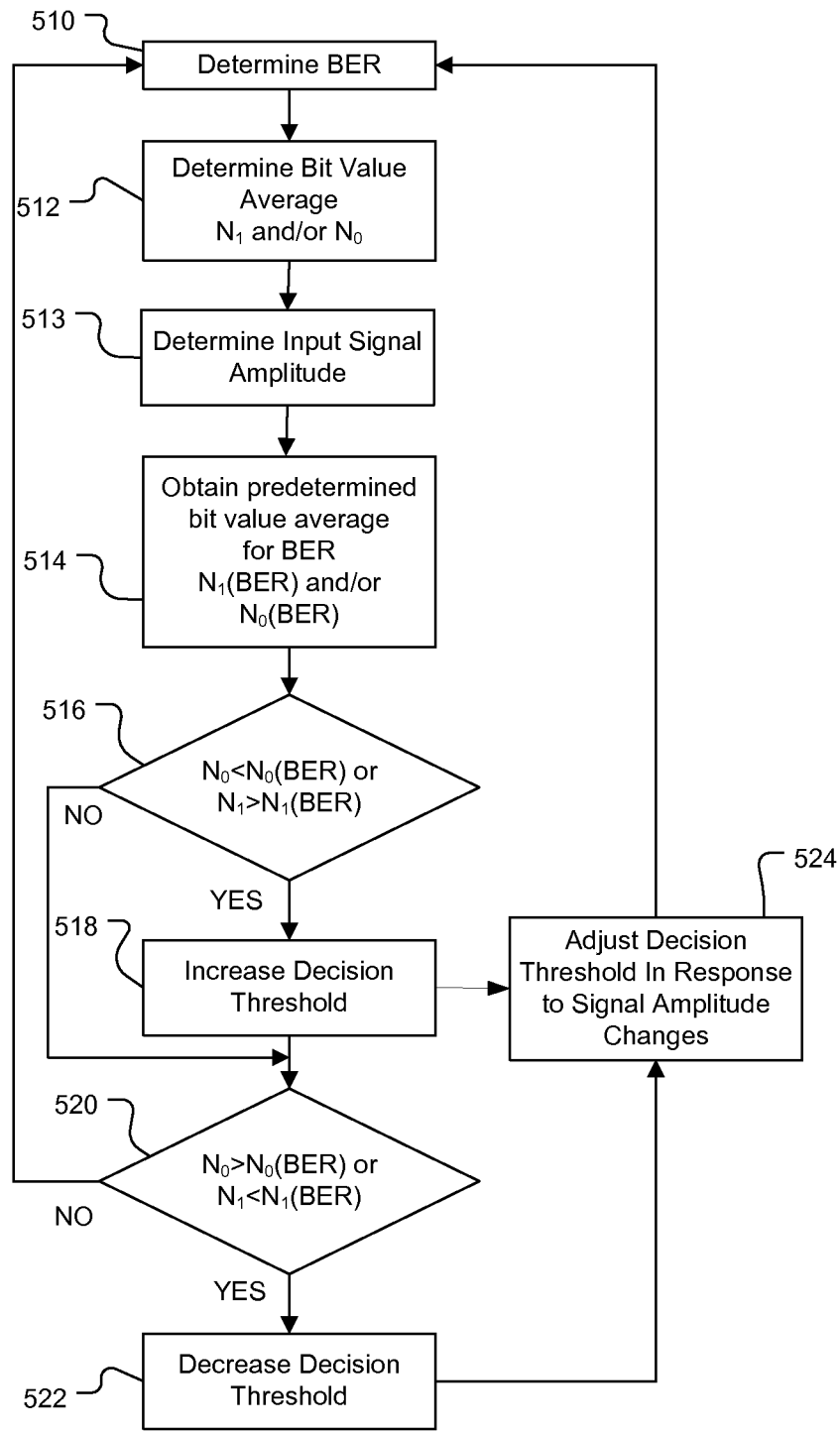

FIGS. 4 and 5 illustrate soft decision threshold control methods, consistent with embodiments described herein, which may be used to adjust soft decision thresholds during operation of a signal receiver that receives and decodes an encoded data stream using a soft decision decoding scheme. The block flow diagrams are illustrated with a particular sequence of steps; however, the sequence of steps merely provides an example of how the general functionality described herein can be implemented. Further, each sequence of steps does not have to be executed in the order presented unless otherwise indicated.

Referring to FIG. 4, when the signal receiver receives and decodes the encoded data stream, the BER associated with the decoded data stream may be determined 410 and the bit value averages associated with one or more of the soft decision thresholds (e.g., the outer soft decision thresholds) may also be determined 412. As discussed above, for example, the BER may be determined by counting the corrected errors in the decoded data stream as compared to the total number of bits in the decoded data stream. The bit value averages may be determined from one or more of the soft decision detection signals produced by the respective soft decision thresholds. The input signal amplitude may also be determined 413, for example, by measuring the RSSI feedback signal. One or more of the soft decision thresholds may then be adjusted 414 in response to the determined BER, the determined bit value averages, and the input signal amplitude.

Referring to FIG. 5, a soft decision threshold control method is described in great detail in reference to adjusting one of the soft decision thresholds. This method may be performed, for example, for each of the outer soft decision thresholds. During operation of the signal receiver, the BER associated with the decoded data stream may be determined 510, the bit value average(s) associated with a soft decision threshold may also be determined 512, and the input signal amplitude may be determined 513. The determined bit value average may include the average number of ones (e.g., $N_1$) that occurred in the bit stream produced by the soft decision threshold and/or the average number of zeros (e.g., $N_0$) that occurred in the bit stream produced by the soft decision threshold. According to this method, a predetermined bit value average associated with a BER level corresponding to the determined BER is also obtained 514. If the average number of ones is used as the bit value average, the predetermined average number of ones (e.g., $N_1(BER)$) for the BER may be obtained. If the average number of zeros is used for the bit value average, the predetermined average number of zeros (e.g., $N_0(BER)$) for the BER may be obtained.

The method may then compare 516, 520 the determined bit value average with the predetermined bit value average for the BER and may adjust 518, 522 the soft decision threshold accordingly. If the determined average number of ones is greater than the predetermined average number of ones for the BER (e.g., $N_1 > N_1(BER)$) or if the determined average number of zeros is less than the predetermined average number of zeros for the BER (e.g., $N_0 > N_0(BER)$), for example, the soft decision threshold may be increased 518. Increasing the soft decision threshold is likely to decrease the average number of ones and correspondingly increase the average number of zeros. If the determined average number of ones is less than the predetermined average number of ones for the BER (e.g., $N_1 < N_1(BER)$) or if the determined average number of zeros is greater than the predetermined average number of zeros for the BER (e.g., $N_0 < N_0(BER)$), the soft decision threshold may be decreased 522. Decreasing the soft decision threshold is likely to increase the average number of ones and correspondingly decrease the average number of zeros. The method may thus continuously monitor the BER and the bit value averages and continuously adjust the outer soft decision thresholds as the BER and the bit value averages change, for example, as a result of changing system performance.

The method may further adjust 524 the decision threshold(s) in response to and proportional to changes in the measured input signal amplitude. These adjustments to the decision threshold(s) in response to changes in measured input signal amplitude may also be made continuously as the changes occur or periodically. The method may thus account for any drift or slow variations of the input signal amplitude over time as a result of the affect of aging on the system and components of the system.

Accordingly, a soft decision threshold control system and method, consistent with embodiments described herein, may be used to improve performance of a soft decision FEC scheme. Consistent with one aspect, an apparatus includes a soft decision detector configured to receive an input signal representative of an encoded data stream and to produce at least one soft decision output signal representative of the encoded data stream using soft information. The soft decision detector is configured to compare the input signal to a plurality of soft decision thresholds to produce a plurality of soft decision detection signals representing the encoded data stream. Each of the soft decision detection signals include a bit stream of binary values. The apparatus also includes a soft decision FEC decoder configured to decode the encoded data stream represented by the soft decision output signal to produce decoded data. The apparatus further includes a decision threshold control unit configured to adjust at least one of the soft decision thresholds in the soft decision detector in response to at least one bit value average determined for the at least one of the soft decision detection signals and in response to a bit error rate (BER) determined for the decoded data. The at least one bit value average represents the average numbers of a binary value occurring in the bit stream of the soft decision detection signal detected using the at least one of the soft decision detection thresholds.

Consistent with another aspect, a method is provided for adjusting soft decision thresholds in a signal receiver that receives an input signal representative of encoded data and detects the input signal using a plurality of soft decision thresholds to produce a plurality of soft decision detection signals each including a data stream of binary values. The signal receiver decodes the encoded data represented by the plurality of soft decision detection signals to produce decoded data. The method includes: determining a bit error rate (BER) for the decoded data; determining a bit value average for at least one of the soft decision thresholds, wherein the bit value average represents the average number of a binary value occurring in the bit stream of the soft decision detection signal detected using the at least one of the soft decision detection thresholds; and adjusting the at least one of the soft decision thresholds in response to the bit value average determined for the at least one of the soft decision thresholds and in response to the BER determined for the decoded data.

Consistent with a further aspect, an optical communication system includes an optical signal transmitter including an encoder for encoding a binary data stream and a modulator for modulating the encoded binary data stream to produce an encoded optical signal and an optical signal receiver for receiving the encoded optical signal. The optical signal receiver includes a demodulator for demodulating the encoded optical signal to provide an input signal representative of the encoded data stream. The optical receiver also includes a soft decision detector configured to receive the input signal and to produce at least one soft decision output signal representative of the encoded data stream using soft information. The soft decision detector is configured to compare the input signal to a plurality of soft decision thresholds to produce a plurality of soft decision detection signals representing the encoded data stream. Each of the soft decision detection signals include a bit stream of binary values. The optical receiver further includes a soft decision FEC decoder configured to decode the encoded data stream represented by the soft decision output signal to produce decoded data. The optical receiver further includes a decision threshold control unit configured to adjust at least one of the soft decision thresholds in the soft decision detector in response to at least one bit value average determined for the at least one of the soft decision detection signals and in response to a bit error rate (BER) determined for the decoded data. The at least one bit value average represents the average numbers of a binary value occurring in the bit stream of the soft decision detection signal detected using the at least one of the soft decision detection thresholds.

Consistent with yet another aspect, a soft decision threshold control system is provided for adjusting soft decision thresholds in an optical signal receiver that receives an input signal representative of encoded data and detects the input signal using a plurality of soft decision thresholds to produce a plurality of soft decision detection signals each including a data stream of binary values. The optical signal receiver decodes the encoded data represented by the plurality of soft decision detection signals to produce decoded data. The soft decision threshold control system includes: a circuit configured to determine a bit error rate (BER) for the decoded data; a circuit configured to determine a bit value average for at least one of the soft decision thresholds, wherein the bit value average represents the average number of a binary value occurring in the bit stream of the soft decision detection signal detected using the at least one of the soft decision detection thresholds; and a circuit configured to adjust the at least one of the soft decision thresholds in response to the bit value average determined for the at least one of the soft decision thresholds and in response to the BER determined for the decoded data.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An apparatus comprising:
    a soft decision detector configured to receive an input signal representative of an encoded data stream and to produce at least one soft decision output signal representative of the encoded data stream using soft information, wherein the soft decision detector is configured to compare the input signal to a plurality of soft decision thresholds to produce a plurality of soft decision detection signals representing the encoded data stream, each of the soft decision detection signals including a bit stream of binary values;
    a soft decision FEC decoder configured to decode the encoded data stream represented by the soft decision output signal to produce decoded data; and
    a decision threshold control unit configured to adjust at least one of the soft decision thresholds in the soft decision detector in response to at least one bit value average and in response to a bit error rate (BER) determined for the decoded data, wherein the at least one bit value average is determined for the at least one of the soft decision thresholds and represents the average number of ones per a sample of bits or the average number of zeros per a sample of bits occurring in the bit stream of the soft decision detection signal detected using the at least one of the soft decision thresholds.

2. The apparatus according to claim 1, further comprising a signal amplitude detector configured to detect a signal amplitude of the input signal, and wherein the decision threshold control unit is configured to adjust the soft decision thresholds in response to changes in the signal amplitude.

3. The apparatus according to claim 1, wherein the soft decision detector comprises a plurality of decision circuits configured to receive the input signal and to produce the respective plurality of soft decision detection signals in response to comparison of the input signal with the plurality of respective soft decision thresholds.

4. The apparatus according to claim 3, wherein the soft decision detector further comprises an encoder configured to encode the plurality of soft decision detection signals into multiple bit words to form the soft decision output signal, and wherein the soft decision FEC decoder is configured to receive the multiple bit words.

5. The apparatus according to claim 1, wherein the threshold control unit is configured to obtain the BER from an error feedback signal representative of the BER.

6. The apparatus according to claim 5, wherein the soft decision FEC decoder is configured to determine the BER and to provide the error feedback signal representative of the BER.

7. The apparatus according to claim 1, wherein the threshold control unit is configured to determine the at least one bit value average from at least one bit value average feedback signal representative of an average number of ones per a sample of bits or the average number of zeros per a sample of bits in the bit stream of the at least one of the soft decision detection signals.

8. The apparatus according to claim 7, further comprising at least one integrating circuit configured to produce the at least one bit value average feedback signal from the at least one of the soft decision detection signals.

9. The apparatus according to claim 1, wherein the decision threshold control unit is configured to adjust a middle one of the soft decision thresholds in response to the BER, and wherein the decision threshold control unit is configured to adjust outer ones of the soft decision thresholds in response to bit value averages determined for outer ones of the soft decision detection signals and in response to the BER.

10. The apparatus according to claim 9, further comprising integrating circuits configured to receive the outer ones of the soft decision detection signals, respectively, and to produce the bit value average feedback signals representative of the average number of ones per a sample of bits or the average number of zeros per a sample of bits in the bit streams of the outer ones of the soft decision detection signals.

11. An apparatus according to claim 1, wherein the BER is the number of erroneous bits corrected by the FEC decoder relative to the total number of bits decoded by the FEC decoder.

12. An apparatus according to claim 1, wherein the decision threshold control unit is configured to store predetermined bit value averages associated with different BER levels, and wherein the decision threshold control unit is configured to adjust the at least one of the soft decision thresholds such that the determined bit value average at least approaches the predetermined bit value average associated with a BER level corresponding to the determined BER.

13. An apparatus according to claim 1, wherein the soft decision FEC decoder is configured to provide 2-bit soft decision decoding, and wherein the soft decision detector uses three different soft decision detection thresholds.

14. An apparatus according to claim 1, wherein the soft decision FEC decoder is configured to provide 3-bit soft decision decoding, and wherein the soft decision detector uses seven different soft decision detection thresholds.

15. A method of adjusting soft decision thresholds in a signal receiver, wherein the signal receiver receives an input signal representative of encoded data, wherein the signal receiver detects the input signal using a plurality of soft decision thresholds to produce a plurality of soft decision detection signals each including a data stream of binary values, and wherein the signal receiver decodes the encoded data represented by the plurality of soft decision detection signals to produce decoded data, the method comprising:

determining a bit error rate (BER) for the decoded data;

determining a bit value average for at least one of the soft decision thresholds, wherein the bit value average represents the average number of ones per a sample of bits or the average number of zeros per a sample of bits occurring in the bit stream of the soft decision detection signal detected using the at least one of the soft decision detection thresholds; and adjusting the at least one of the soft decision thresholds in response to the determined bit value average and in response to the determined BER.

16. The method of claim 15 further comprising determining an input signal amplitude of the input signal, and wherein adjusting the at least one of the soft decision thresholds includes adjusting the at least one of the soft decision thresholds in response to changes in the input signal amplitude.

17. The method of claim 15 wherein adjusting the at least one of the soft decision thresholds includes adjusting outer ones of the soft decision thresholds in response to bit value averages determined for outer ones of the soft decision detection signals and in response to the BER, and further comprising adjusting a middle one of the soft decision thresholds in response to the BER.

18. The method of claim 15 wherein predetermined bit value averages for outer ones of the soft decision thresholds are associated with different BER levels, wherein adjusting the at least one of the soft decision thresholds includes determining that the bit value average for the at least one of the soft decision thresholds is different than a predetermined bit value average associated with a BER level corresponding to the determined BER and adjusting the at least one of the soft decision thresholds such that the bit value average for the at least one of the decision thresholds at least approaches the predetermined bit value average.

19. The method of claim 18 wherein adjusting the at least one of the soft decision thresholds includes increasing the at least one of the soft decision thresholds if a determined average number of ones is higher than a predetermined average number of ones or if a determined average number of zeros is lower than a predetermined average number of zeros.

20. The method of claim 18 wherein adjusting the at least one of the soft decision thresholds includes decreasing the at least one of the soft decision thresholds if a determined average number of ones is lower than a predetermined average number of ones or if a determined average number of zeros is higher than a predetermined average number of zeros.

21. The method of claim 15 further comprising receiving a bit value average feedback signal generated by integrating the bit stream of the at least one of the soft decision detection signals, wherein the bit value average is determined from the bit value average feedback signal.

22. An optical communication system comprising:

an optical signal transmitter comprising an encoder for encoding a binary data stream and a modulator for modulating the encoded binary data stream to produce an encoded optical signal;

an optical signal receiver for receiving the encoded optical signal, the optical signal receiver comprising:

a demodulator for demodulating the encoded optical signal to provide an input signal representative of the encoded data stream;

a soft decision detector configured to receive the input signal and to produce at least one soft decision output signal representative of the encoded data stream using soft information, wherein the soft decision detector is configured to compare the input signal to a plurality of soft decision thresholds to produce a plurality of soft decision detection signals representing the encoded data stream, each of the soft decision detection signals including a bit stream of binary values;

a soft decision FEC decoder configured to decode the encoded data stream represented by the soft decision output signal to produce decoded data; and a decision threshold control unit configured to adjust at least one of the soft decision thresholds in the soft decision detector in response to at least one bit value average and in response to a bit error rate (BER) determined for the decoded data, wherein the at least one bit value average is determined for the at least one of the soft decision thresholds and represents the average numbers of ones per a sample of bits or the average number of zeros per a sample of bits occurring in the bit stream of the soft decision detection signal detected using the at least one of the soft decision thresholds.

23. A soft decision threshold control system configured to adjust soft decision thresholds in an optical signal receiver, wherein the optical signal receiver receives an input signal representative of encoded data, wherein the optical signal receiver detects the input signal using a plurality of soft decision thresholds to produce a plurality of soft decision detection signals each including a data stream of binary values, and wherein the optical signal receiver decodes the encoded data represented by the plurality of soft decision detection signals to produce decoded data, the system comprising:

a circuit configured to determine a bit error rate (BER) for the decoded data;

a circuit configured to determine a bit value average for at least one of the soft decision thresholds, wherein the bit value average represents the average number of ones per a sample of bits or the average number of zeros per a sample of bits occurring in the bit stream of the soft decision detection signal detected using the at least one of the soft decision detection thresholds; and a circuit configured to adjust the at least one of the soft decision thresholds in response to the determined bit value average and in response to the determined BER.

24. The soft decision threshold control system of claim 23 further comprising a circuit configured to determine an input signal amplitude of the input signal, and wherein the circuit configured to adjust the at least one of the soft decision thresholds is configured to adjust the at least one of the soft decision thresholds in response to changes in the input signal amplitude.

25. The soft decision threshold control system of claim 23 further comprising a circuit configured to integrate the at least one of the soft decision detection signals and to produce a bit value average feedback signal representative of the average number of ones per a sample of bits or the average number of zeros per a sample of bits in the bit stream of the at least one of the soft decision detection signals.

* * * * *